2,973,315

TWO STEP PROCESS FOR REFINING RAW PETROLEUM LUBRICATING OILS WITH SULFURIC ACID AND HYDROGEN

William B. Watson, Park Forest, Ill., assignor to Sinclair Refining Company, New York, N.Y., a corporation of Maine No Drawing. Filed Jan. 15, 1958, Ser. No. 708,977

2 Claims. (Cl. 208—211)

My invention relates to an improved method for refining petroleum lubricating oils.

Utilizing sulfuric acid to refine raw lubricating oil is well known in the art. In general, the process consists of mixing sulfuric acid with the oil, allowing the resultant sludge to settle to produce an acid oil layer, neutralizing the sulfonic acids and unreacted sulfuric acid present in the acid oil layer with a base material such as caustic soda to provide a neutralized oil, and water washing the neutralized oil until free of the base, and earth treating.

The acid treating can be accomplished in a batch process or continuous process. The acid can be added all at once or by increments. The acid treating is generally performed at 50° to 150° F., although in special cases higher and lower temperatures are used. Acid dosage can vary from one pound per barrel of stock to 500 pounds per barrel of the oil, but a range of 5 to 300 pounds per barrel of oil is generally employed. Acid strength can vary from about 60 weight percent sulfuric acid to 20 weight percent oleum, although again higher and lower acid strengths have been used in special instances. The contact time between oil and acid can be varied over a wide range, but generally at least 30 minutes is required in a batch process. Contact time is influenced by the amount of agitation; contact time is reduced with increased agitation.

After the acid treatment is completed, the sludge produced is allowed to settle and is removed from the acid oil. Centrifuging is sometimes employed to separate sludge and oil. Also, after the bulk of the sludge is removed, the oil is sometimes blown with air for from 5 to 120 minutes to agglomerate fine sludge. The agglomerate then settles and can be removed from the oil.

There are numerous modifications for sulfuric acid-treating oils and removing the sludge fromed by the acid treatment. However, regardless of the process employed, the fresh acid-treated oil, termed "acid oil," contains free sulfuric acid, sulfur dioxide, sulfuric esters and sulfonic acids in solution. Thus, some type of neutralizing treatment is necessary.

One commercial process for the neutralization of acid oil involves four steps. In the first step, the acid oil is mixed with a base material such as sodium hydroxide, potassium hydroxide, sodium carbonate or ammonium hydroxide. An excess of the amount of base required to neutralize the acids is added. The base is added in water solution at, for example, a 20 percent concentration. In the second step, the mixture is settled to provide a hydrocarbon layer and an aqueous layer. Settling times varies from 10 minutes to seven days or more, depending on the emulsifying tendencies of the oil being treated. After settling, the third step is to wash the oil with water to remove the excess base material. In the fourth step, the neutralized, water-washed oil is given a light earth treatment to remove final traces of base material and acids. Both percolation and contacting processes are employed in the earth treating step.

However, while neutralization of acid oil in the manner described yields a satisfactory oil in many instances, the base treatment and water-washing steps produce emulsions which are difficult to break and which make settling times excessive for some oils, particularly those having viscosities above 500 Saybolt seconds at 100° F. In addition, it is not possible to wash all of the base sulfonates from such oils and, due to their presence, the oils tend to absorb water and became hazy. Both of these drawbacks add to the cost of the oil production.

I have now found that a hydrogenation of the acid oil is an effective means for removing free sulfuric acid, sulfur dioxide, sulfuric esters and sulfonic acids from a sulfuric acid-treated oil and provides a bright refined lubricating oil having substantially no acid, e.g., an acid number of about 0.05 (ASTM D974). This oil is suitable for use without further processing, i.e., without neutralizing, settling, water washing and earth treating, and can be steam or vacuum distilled to yield various viscosity grades of lubricating oils.

My process has been found to be particularly effective in the preparation of lubricating oil stocks from naphthenic and Mid-Continent crude oils. Such crude oils, if they contain wax, are preferably dewaxed before being subjected to the acid-treating step and the hydrogenation step, although the dewaxing can follow the hydrogenation operation. This dewaxing can be carried out, for example by solvent dewaxing using methyl ethyl ketone and toluene as the solvent to achieve oil of below 25° F. pour point (ASTM D97). The pour point after dewaxing is determined by that required in the finished oil.

The hydrogenation step of my process involves employing a hydrogenation catalyst. Various methods for manufacturing such catalysts have been described in the art, such as in Byrns Patent 2,325,033, and such catalysts generally analyze of from about 2 to 5 percent by weight of cobalt oxide and from about 5 to 15 percent by weight of molybdic oxide, the balance being alumina. Also useful are, for instance, nickel on porcelain, silica or alumina; molybdenum, tungsten, cobalt, nickel oxides and sulfides; and platinum and palladium on alumina. A preferred catalyst is cobalt molybdate supported on alumina prepared by the method of Keith el al. described in copending application Ser. No. 612,892, filed September 28, 1956.

Further, in the hydrogenation step of my process, a temperature of from 400° to 800° F., a pressure of from 400 to 1000 p.s.i.g. and a weight hourly space velocity (weight units of oil per weight unit of catalyst per hour) of from 0.5 to 5.0 are used. The acid oil is hydrogenated while it is in admixture with from 700 to 5000 standard cubic feet of hydrogen per barrel of oil and the operation is carried out in such manner that from 20 to 200 standard cubic feet of hydrogen per barrel of oil feed is consumed. The severity of hydrogenation, as measured by hydrogen consumption, is dependent upon the amount of acids present in the acid oil. The amount of acids is related to the severity (dosage and strength of acid) of the acid treatment and is measured by acid number (ASTM D974). Generally, the acid number of acid oils produced as described previously is between 0.5 and 5.0, although higher acid numbers are obtained in some cases.

A specific example which illustrates my process is as follows:

A raw naphthenic distillate produced by vacuum distillation of South Texas non-waxy crude oil was employed as the charge stock. This charge stock had the following characteristics:

| | |
|---|---|
| Gravity, °API (ASTM D287) | 19.9 |
| Viscosity, SUS/100° F. (ASTM D88) | 1594 |
| Viscosity, SUS/210° F. (ASTM D88) | 81.1 |
| Viscosity index (ASTM D567) | 9.9 |
| Pour, °F. (ASTM D97) | −5 |
| Color, NPA (ASTM D155) | 8− |
| Acid No. (ASTM D974) | 0.01 |
| Specific dispersion[1] | 141.9 |

[1] Reference: The Chemical Constituents of Petroleum by A. N. Sachanen, page 109, published by Reinhold Publishing Corporation in 1945. G and E lines of mercury were used in refractometer measurements and temperature was 20° C.

The charge stock was subjected to sulfuric acid treatment in a batch operation. The strength of the sulfuric acid employed was 98 weight percent and the acid dosage was 32 pounds of acid per barrel of charge stock. The acid oil mixture was mixed for 45 minutes at a temperature of from 85° to 90° F. The acid oil mixture was then allowed to settle for 16 hours and sludge was drawn off. The acid oil mixture was then subjected to an air blow for 2 hours and again allowed to settle for 16 hours. Sludge was again drawn off. The acid oil yield resulting from this operation was 90 percent by weight. The acid oil had the following characteristics:

| | |
|---|---|
| Gravity, °API | 21.1 |
| Viscosity, SUS/100° F. | 1393 |
| Color, NPA | 5− |
| Acid No. (ASTM D974) | 1.34 |
| Specific dispersion | 132.5 |

The acid oil prepared in the above-described manner was then subjected to a hydrogenation operation. In a continuous process, the acid oil was reacted with 1500 standard cubic feet of hydrogen per barrel of acid oil at a temperature of 700° F. and a pressure of 500 p.s.i.g. in contact with a cobalt molybdate on alumina catalyst. The catalyst used analyzed, on an ignited basis, 2.45 weight percent cobalt, 8.53 weight percent molybdic oxide and the remainder alumina. The weight hourly space velocity was 1.0. Light steam stripping to remove dissolved gases followed the hydrogenation. The finished oil yield was 99.9+ percent by weight. This finished oil had the following characteristics:

| | |
|---|---|
| Gravity, °API | 22.1 |
| Viscosity, SUS/100° F. | 802 |
| Viscosity, SUS/210° F. | 65.1 |
| Viscosity index | 38.4 |
| Pour, °F. | +5 |
| Color, NPA | 3− |
| Acid No. (ASTM D974) | 0.00 |
| Specific dispersion | 130.1 |

It is to be noted that the finished refined oil produced by my process has an excellent color, no acid member and is equivalent tin specific dispersion and viscosity index to similar lubricating oils produced from South Texas crude by utilizing sodium hydroxide to neutralize the acid oil. It is suitable for use in lubricating oil formulations requiring an acid-treated naphthenic lube stock without further treatment.

I claim:

1. In the refining of a raw petroleum lubricating oil, the steps consisting essentially of treating the lubricating oil with sulfuric acid to furnish an oil containing acidic components and sludge, separating the sludge from the oil and then passing hydrogen and the separated oil containing acidic components into contact with a hydrogenation catalyst at a temperature within the range from 400° F. to 800° F. and at a pressure within the range from 400 p.s.i.g. to 1000 p.s.i.g., whereby a lubricating oil of reduced acidity is obtained, said raw petroleum lubricating oil being derived from a crude selected from the group consisting of naphthenic crudes and Mid-Continent crudes.

2. The method of claim 1 wherein said catalyst is cobalt molybdate supported on alumina.

References Cited in the file of this patent

UNITED STATES PATENTS

| | | |
|---|---|---|
| 2,627,496 | Stratford | Feb. 3, 1953 |
| 2,636,843 | Arnold et al. | Apr. 28, 1953 |
| 2,908,638 | Fear | Oct. 13, 1959 |